(12) United States Patent
Cyriac et al.

(10) Patent No.: US 8,019,069 B1
(45) Date of Patent: Sep. 13, 2011

(54) METHOD AND APPARATUS FOR ALTERING PARTICIPANTS IN A CONFERENCE CALL TO TOPICS OF INTEREST

(75) Inventors: Shaiju Cyriac, Westminster, CO (US); Diana M. D'Angelo, Broomfield, CO (US); Sreerupa Das, Arvada, CO (US); Bruce W. Hill, Broomfield, CO (US); William C. Leck, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 1134 days.

(21) Appl. No.: 11/553,368

(22) Filed: Oct. 26, 2006

(51) Int. Cl.
*H04M 3/42* (2006.01)

(52) U.S. Cl. .............................. 379/202.01; 379/201.01

(58) Field of Classification Search ............. 379/202.01, 379/201.01, 203.01, 204.01; 707/100; 705/8
See application file for complete search history.

(56) References Cited

U.S. PATENT DOCUMENTS

| | | | |
|---|---|---|---|
| 6,396,510 | B1 | 5/2002 | Pendse et al. |
| 2001/0014866 | A1 | 8/2001 | Conmy et al. |
| 2005/0050061 | A1* | 3/2005 | Karstens ...................... 707/100 |
| 2006/0106872 | A1 | 5/2006 | Leban et al. |
| 2006/0224430 | A1* | 10/2006 | Butt ................................... 705/8 |
| 2007/0005408 | A1* | 1/2007 | Boss et al. ......................... 705/8 |
| 2008/0040187 | A1 | 2/2008 | Carraher et al. |

OTHER PUBLICATIONS

Dey et al., "The Conference Assistant: Combining Context-Awareness with Wearable Computing," in the Proceedings of the 3rd IEEE International Symposium on Wearable Computers, 1999, http://www.cc.gatech.edu/fce/ctk/pubs/ISWC99.pdf, 9 pages.
U.S. Appl. No. 11/553,379, filed Oct. 26, 2006, Cyriac et al.

* cited by examiner

*Primary Examiner* — Thjuan K Addy
(74) *Attorney, Agent, or Firm* — Sheridan Ross P.C.

(57) ABSTRACT

The present invention provides an indication to a registered participant of a conference call that an agenda item of interest has been reached. The conference call participant registers to receive a notification signal for particular agenda items that are scheduled to be covered during the conference call. During the conference call, transitions from one agenda item to the next are detected. Such transitions may be detected by receiving a selection by the conference call host or other authority of the agenda item that is to be covered next. Alternatively, a client alerter application may automatically determine which agenda item is being covered. In response to the detection of a transition to a new agenda item, a determination is made as to whether any of the conference call participants has registered to receive notification of the new agenda item. A notification signal is then provided to any participant who has registered to receive such notification.

20 Claims, 5 Drawing Sheets

METHOD AND APPARATUS FOR ALTERING PARTICIPANTS IN A CONFERENCE CALL TO TOPICS OF INTEREST

FIELD

The present invention is directed to providing participants in a conference call an alert signal to indicate when a topic of interest is being discussed.

BACKGROUND

Conference calls are often held as a way to conduct meetings without requiring that the participants physically occupy the same space. Conference calls can therefore save time and resources, by allowing participants to monitor or actively contribute to the content of a meeting from their office, home or other location. However, this also provides the opportunity for a participant to become engaged with other activities, and become distracted from the content of the conference call, particularly where the agenda for the call includes a long list of items and/or items that are not of interest to the participant.

During a long conference call, a participant can listen to the entire conference call and wait for their turn to contribute or for topics of interest to be reached. However, this can mean that the participant spends a considerable amount of time listening to topics that are of no interest to the participant, wasting the time of the participant and lowering the participant's productivity by taking him or her away from other work Alternatively, the participant can take another call, respond to an office visitor, engage in email correspondence, or perform other work or activities while waiting for agenda items of interest to be reached. As a result of this multitasking, the participant can loose track of the agenda items being covered in the conference call, and miss important discussions of items that the participant is interested in or should be contributing to.

In order to assist in ordering conference calls and helping participants track what items are being covered, various techniques have been devised. For example, outlines or agendas may be distributed to participants prior to the conference call. However, agendas in the form of documents are unable to provide anything more than an estimate of how long each agenda item will be covered during the conference call. In addition, the value of documentary agendas becomes reduced when the host or other participants address items out of their indicated order.

Internet based multimedia applications have also been developed for assisting participants in following a conference call. Although such applications can provide a user with real time presentation of video or textual information, in addition to voice information, they do not provide any special indication to a multi-tasking participant of agenda items that are of particular interest to the participant, such that the participant might be alerted to re-engage with the conference call.

SUMMARY

The present invention is directed to solving these and other problems and disadvantages of the prior art. In accordance with embodiments of the present invention, systems and methods are provided for alerting a conference call participant to agenda items that are of particular interest to that participant. Accordingly, a participant who may be multitasking or who has otherwise lost track of items being covered can be alerted to re-engage with the conference call at appropriate times. Embodiments of the present invention therefore allow conference call participants to perform other tasks, without missing agenda items that are of interest to individual participants.

In accordance with embodiments of the present invention, a conference call participant registers an interest in one or more agenda items that are to be covered. Information regarding the agenda items of interest to different conference call participants can be stored in a server computer or other central repository for such information. During the conference call, the host or other authority provides input indicating the agenda item currently being covered. For example, as discussion of one agenda item is completed and the discussion of a next agenda item is about to begin, the conference call host or another authority can indicate the transition to a new or next agenda item to an administration application. A conference call agenda item notification feature or application can then cause a notification signal to be generated to alert all of the conference call participants that have registered an interest in the agenda item that is about to be covered.

The notification signal may comprise an audible and/or visual indication at a device associated with the registered participant. For example, a tone may be generated by a computer or other device associated with the registered participant that is in communication with the administration application. As another example, a pop-up window or message may be generated on a display of a device associated with the registered participant. As yet another example, a call may be initiated to the registered participant and the participant may be bridged to the conference call.

In accordance with still other embodiments of the present invention, a notification application can monitor the conference call to determine when an agenda item of interest to a registered participant is being addressed or is about to be addressed. Accordingly, information related to the item being covered in order to initiate a notification signal can be generated automatically. Moreover, such a notification application can be executed by a central device, such as a server computer or a host computer, or by a device associated with a registered participant.

Additional features and advantages of embodiments of the present invention will become more readily apparent from the following discussion, particularly when taken together with the accompanying drawings.

DETAILED DESCRIPTION

Figure 1:
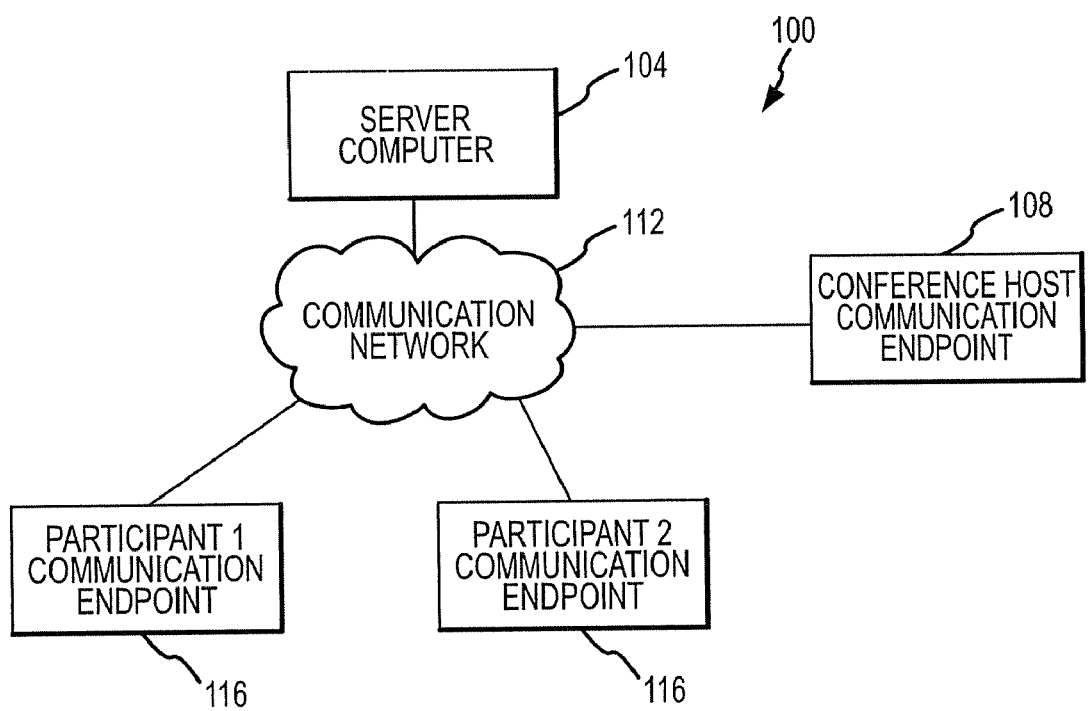
FIG. 1 depicts components of a conference call system in accordance with embodiments of the present invention.

Embodiments of the present invention are directed to providing an indication to a registered participant of a conference call when an agenda item of interest has been reached. FIG. 1 illustrates components of a conference call system 100 in accordance with embodiments of the present invention. The conference call system 100 may include a conference call server computer 104. The conference call server computer 104 may comprise a general purpose computer capable of executing application programming for use in connection with a conference call system. In accordance with embodiments of the present invention, the conference call server computer 104 may serve as a central repository for conference call agenda information and information related to agenda items that conference call participants have registered an interest in. The conference call server computer 104 may also operate to automatically detect transitions from one agenda item to the next. The conference call server 104 may be in communication with a conference call host communication endpoint 108, either directly or through a communication network 112.

The conference call host communication endpoint 108 may provide a communication device or facility through which the conference call host may participate in a conference call. The conference call host communication endpoint may also provide an interface through which agenda items are entered and administered. In accordance with embodiments of the present invention, the conference call host communication endpoint may also provide an authority application through which the host can indicate the current agenda item and transitions from one agenda item to a next agenda item. In accordance with still other embodiments of the present invention, the conference call host communication endpoint may perform some or all of the functions of a conference call server computer 104, in which case it may serve as a repository for conference call agenda information and/or information related to agenda items that conference call participants have registered an interest in, and may automatically detect transitions from one agenda item to the next agenda item.

The system 100 also includes one or more participant communication endpoints 116. The participant communication endpoints 116 generally provide a communication device or facility through which a conference call participant may participate in a conference call. In addition, the participant communication endpoints 116 generally include a participant notification signal application or facility, to notify an associated participant when an agenda item in connection with which the participant has registered an interest has been reached. In accordance with embodiments of the present invention, the participant communication endpoints 116 may also operate to automatically detect transitions from one agenda item to the next. The participant communication devices 116 may be in communication with the server computer 104 and/or the conference call host communication endpoint 104 through a direct connection, or through the communication network 112. In accordance with further embodiments of the present invention, the conference call server 104 can be omitted, and the conference call host device 104 and the conference call participant device 116 can be in communication with one another directly or through a network 112.

The communication network 112 may comprise one or more networks of one or more types. For example, the communication network 112 may comprise the public switched telephony network (PSTN), and/or an Internet protocol network, such as the Internet.

Figure 2:
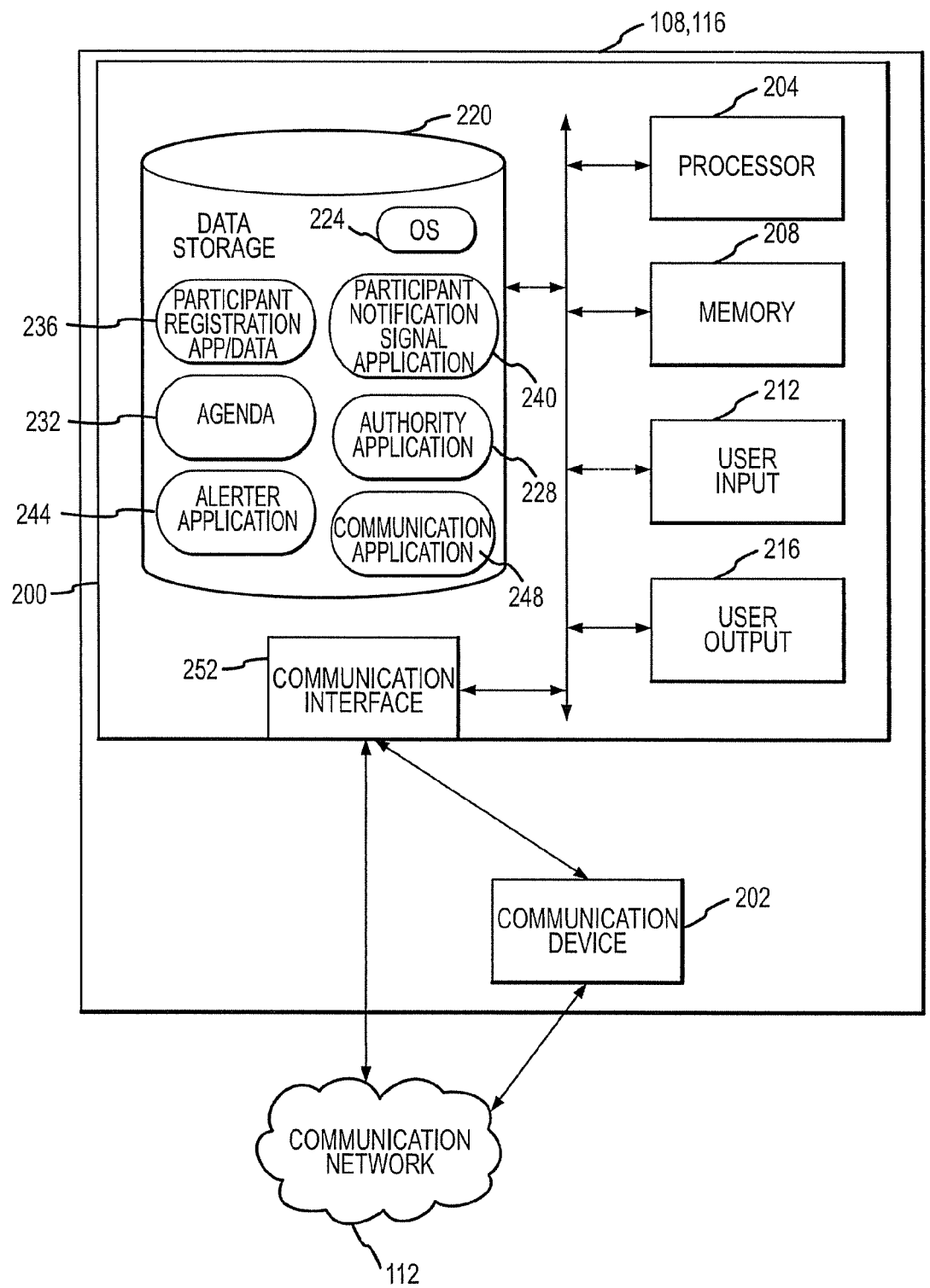
FIG. 2 depicts components of a communication endpoint included in a conference call system in accordance with embodiments of the present invention.

FIG. 2 illustrates components that may included as part of a conference host communication endpoint 108 or a participant communication endpoint 116. Because such components may be included as part of (or not included as part of) such devices 108, 116 in various combinations, it should be understood that the various components are not necessarily limited to any particular device. In addition, at least some of the applications and functions described in connection with the endpoints 108, 116 may alternatively or additionally be performed by the operation of a server computer 104. However, where a typical embodiment includes particular components as part of a particular device of the system 100, mention of such typical arrangement will be made.

In general, a communication endpoint 108, 116 includes a computing device 200, that is capable of communicating over a communication network 112. Accordingly, a computing device 200 may include a general purpose computer or other programmable device. Examples of a computing device therefore include a desktop computer, a laptop computer, a personal digital assistant (PDA), or other device. In addition, a communication endpoint 108, 116 may include a dedicated communication device 202. As an example, the dedicated communication device 202 may comprise a public switched telephony system (PSTN) or voice over Internet protocol (VoIP) desk telephone. The dedicated communication device 202 may also include a handset and/or speakerphone functionality provided for delivering and receiving audible signals, for example in support of a soft telephone function implemented by the computing device 200. In accordance with still other embodiments of the present invention, functions of a dedicated communication device may be performed by components that are integral to the computing device 200.

The components of the computing device 200 may include a processor 204 capable of executing program instructions. Accordingly, the processor 204 may include any general purpose programmable processor or controller for executing application programming. Alternatively, the processor may comprise a specially configured application specific integrated circuit (ASIC). The processor 204 generally functions to run programming code implementing various functions performed by the computing device 200. For example, such functions may include functions enabled through the execution of programming code or other application instructions. The functions may include the recognition of a transition to an agenda item of interest, the delivery of a signal to a conference call participant to notify the participant that an agenda item of interest is being discussed, the registration of a participant's interest in selected agenda items, receiving agenda items and input indicating an agenda item currently being discussed, and storing data related to a conference call agenda and conference call participants.

The computing device 200 may additionally include memory 208 for use in connection with the execution of programming by the processor 204, and for the temporary or long-term storage of data or program instructions. For example, the memory may be used in connection with the operation of applications. The memory 208 may comprise solid-state memory resident, removable or remote in nature, such as DRAM and SDRAM. Where the processor 204 comprises a controller, the memory 208 may be integral to the processor 204.

In addition, various user input devices 212 and user output devices 216 may be provided. Examples of user input devices 212 include a microphone, keyboard, numeric keypad and pointing device combined with a screen or other position encoder. Examples of user output devices 216 include a speaker, alphanumeric display, ringer, or display. In general, user input 212 and user output 216 devices associated with a conference host communication endpoint 108 may be used by conference call hosts or administrators to input agenda items and information related to a transition to a new agenda item and/or information identifying a current agenda item. User input 212 and user output 216 devices associated with a conference call participant communication endpoint 116 may be used by conference call participants to view an agenda of items or topics to be scheduled to be covered during a conference call, to register an interest in selected items, and to receive a notification when an agenda item in which the participant has registered an interest is under discussion. In addition, user input 212 and user output 216 devices may be used by a conference call host or participant where input and/or output comprising the content of a conference call are provided, at least for a particular conference call host or participant, through peripheral devices 212, 216 associated with a computing device 200. Although the user inputs 212 and outputs 216 are shown as being directly connected to the related device, it should be appreciated that features or applications can be accessed remotely.

Data storage 220 may be provided for the storage of application programming and/or data. For example, operating system software 224 may be stored in the data storage 220. An example of a particular application that may be stored in data storage 220 is an authority application 228. The authority application 228 may provide for the entry of items comprising a conference call agenda 232 by a conference call host or other authority, and for the distribution of the agenda to conference call participants. The conference call agenda may be stored as data in the data storage 220. Distribution of the agenda can include making the agenda 232 available to conference call participants from data storage 220 associated with the conference host communication endpoint 108 or from another device, such as a server computer 104. Alternatively or in addition, distribution of the agenda can include providing copies of the agenda 232 to participant communication endpoints 116. A participant registration application and/or data 236 can also be stored in data storage 220. A participant registration application 236 may provide a facility through which a conference call participant can register a particular interest in selected conference call agenda 232 items.

As another example, a conference call participant notification signal application 240 may be stored in data storage 220. The conference call participant notification signal application 240 may operate to provide a notification signal to a conference call participant once an agenda item in which the participant has registered an interest has been reached. Input indicating to the conference call participant notification signal application 240 of a transition to a new agenda item or of the current agenda item may be provided by the authority application 228 in response to a selection by the conference call host or other authority of a current agenda 232 item. Alternatively, information related to a current agenda 232 item may be provided to a conference call participant notification signal application 240 by an alerter application 244. The alerter application 244 may function to detect key words indicating a transition to a particular agenda 232 item or indicating that a particular agenda 232 item is being discussed.

One or more communication applications 248 may also be stored in data storage 220. A communication application 248 may operate to facilitate the transfer of data, which may include data comprising the content of a conference call, between devices 104, 108 and/or 116 in a conference call system 100. Examples of communication applications 248 include web browsers, VoIP telephony applications, e-mail applications, instant messaging applications or any other applications for supporting communications between devices across a network 112. Communication applications 248 may also be provided for supporting communications between the associated device and other devices via the communication network 112.

A conference call host 108 or participant 116 communication endpoint 108, 116 may also include one or more communication network interfaces 252. Examples of communication network interfaces 252 include a packet data network interface, such as a wired or wireless Ethernet interface, or a Fiber Channel (FC) interface. As another example, a communication network interface 252 may comprise an interface to the PSTN or a PBX.

Figure 3:
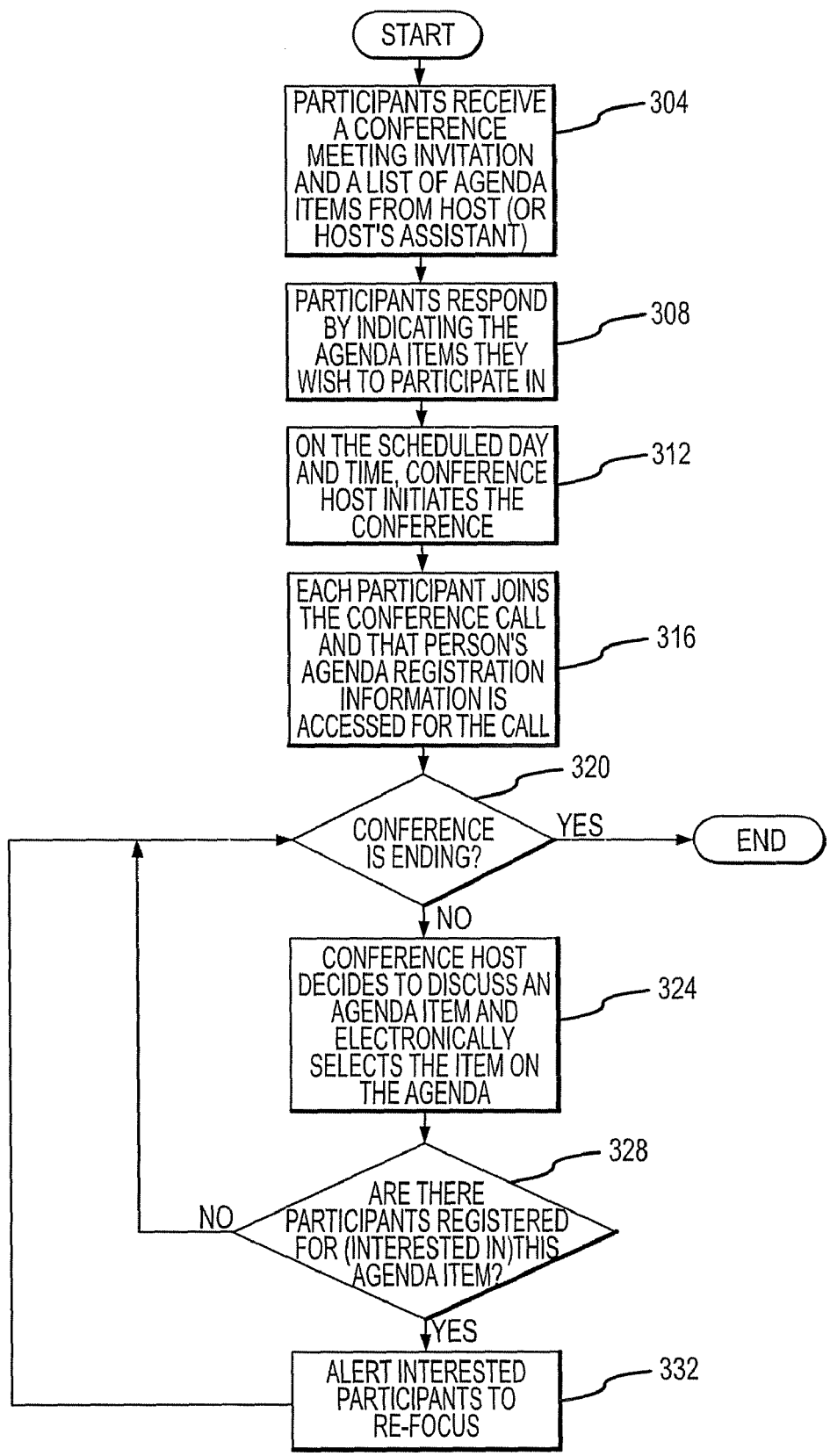
FIG. 3 is a flowchart depicting aspects of the operation of a conference call system in accordance with embodiments of the present invention.

Aspects of the operation of a conference call system 100 in accordance with embodiments of the present invention are illustrated in FIG. 3. Initially, conference call participants receive a conference call meeting invitation and a list of agenda items from the conference call host or another authority (step 304). The list of agenda 232 items may be entered by the host or other authority through an authority application 240 running on a server 104 or on a host communication endpoint 108. The agenda 232 may be distributed to conference call participant communication endpoints 116 via the communication network 116. Although a fully automated or computerized distribution of the agenda 232 can be provided, it should be appreciated that distribution of the agenda 232 can be made through the distribution of hard copies or some other means.

At step 308, the participants respond by indicating the particular agenda 232 items they wish to participate in, or the particular agenda items in which they are especially interested. In accordance with embodiments of the present invention, a participant may register their interest by making selections using a participant registration application 236. The selections may then be stored, for example in a server 104 or a host communication endpoint 108. As can be appreciated by one of skill in the art after consideration of the present disclosure, the entry of agenda 232 items and the registration or indication by participants of agenda 232 items of interest can be performed in advance of the conference call. In accordance with further embodiments of the present invention, a participant may add, delete, or modify the agenda items in which the participant has registered an interest. Moreover, a participant may do so during a conference call, for example by entering appropriate indications using a participant registration application 236.

The host initiates the conference call on the scheduled day and time (step 312). Each participant joins the conference call, and each participant's registration information is accessed or made available (step 316). The registration information may be accessed by or made available to the authority application 228.

At step 320, a determination is made as to whether the conference call is ending. If it is determined at step 320 that the conference call is not ending, the conference call host begins to discuss or initiates discussion of a first agenda item, and makes a selection of the entry for that agenda item in the authority application 228 (step 324). In accordance with embodiments of the present invention, selection of an entry for an agenda 232 item may comprise using a mouse or other position encoder or pointing device to select the current agenda 232 item from a list of agenda 232 items displayed by the authority application 228.

In response to the selection of an agenda item (or the selection of a new agenda item), a determination is made as to whether any of the conference call participants have registered an interest in the current agenda 232 item (step 328). If any participants have registered an interest in the agenda item, an alert or notification signal is provided to those participants (step 332). In accordance with embodiments of the present invention, the alert signal may comprise an audible and/or visible signal generated by a participant communication endpoint 116 associated with the registered participant. As examples, an alert provided to a conference call participant indicating that an agenda item of interest to that participant has been reached may comprise a pop-up window, an alert tone generated by a user output 216 of a computing device 200 comprising a speaker or by a communication device 202, and indicator lamp provided by an endpoint 116, or a combination of alerts by different devices. In addition, the alert or notification signal may include an identifier informing the conference call participant of the identity of the agenda item in connection with which the alert signal has been generated. Accordingly, the participant is provided with an alert or notification to pay attention or to re-focus on the conference call, because an agenda 232 item of interest to the participant is about to be discussed. Therefore, a conference call participant who may be engaged in multitasking or who has otherwise begun attending to something other than the conference call is alerted to pay attention to the conference call, so that they can avoid missing an item or topic of interest.

After an alert is generated at step 332, or after a determination is made at step 328 that no participant has registered an interest in the current agenda item, the process may return to step 320, to determine whether the conference call is ending. If it is determined at step 320 that the conference call is ending, the process may end.

Figure 4:
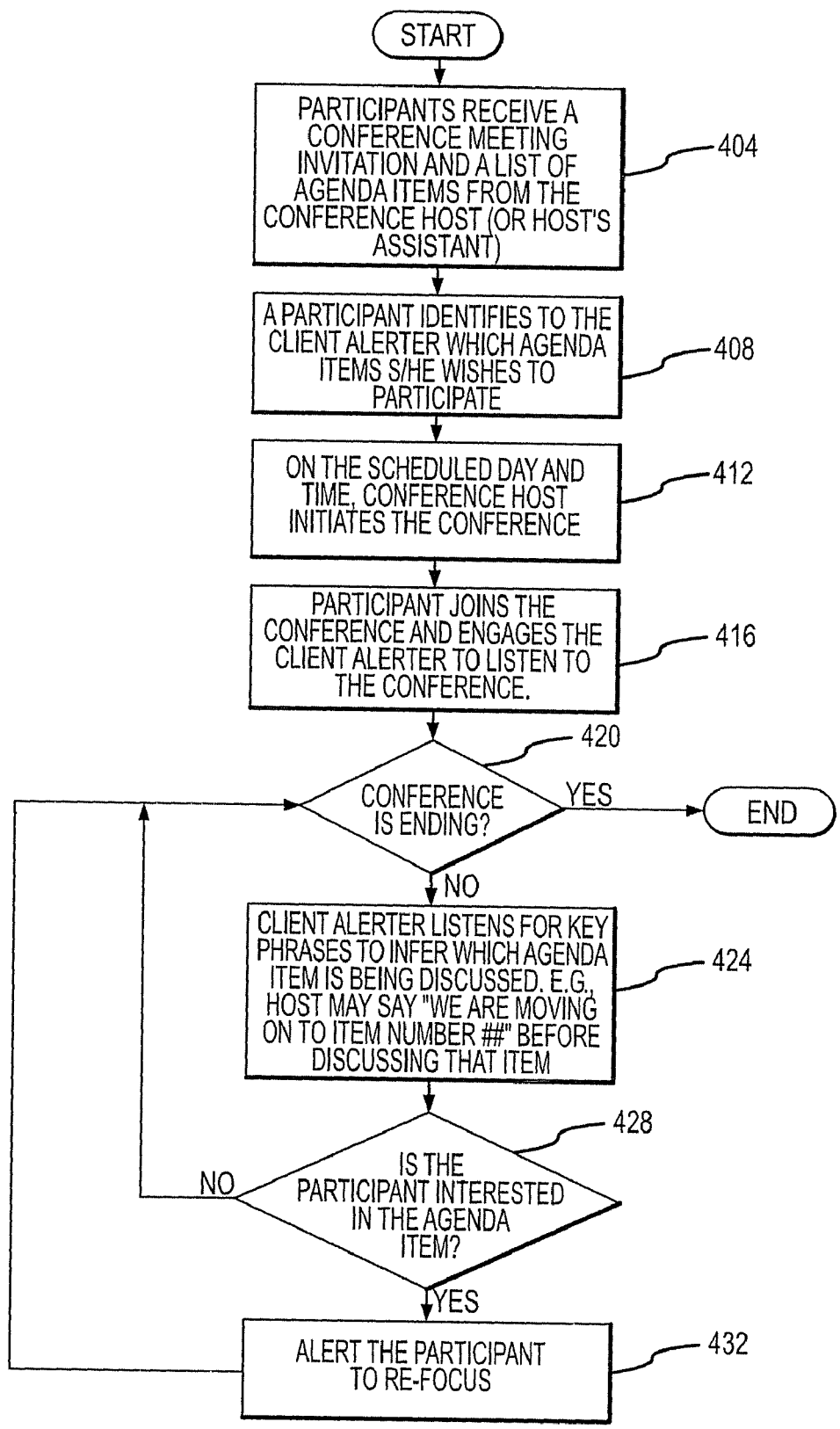
FIG. 4 is a flowchart depicting aspects of the operation of a conference call system in accordance with other embodiments of the present invention.

Aspects of the operation of other embodiments of the present invention are illustrated in connection with FIG. 4. Initially, conference call participants receive a conference call meeting invitation and a list of agenda items from the conference call host or another authority (step 404). As in other embodiments, the list of agenda 232 items may be entered by the host or other authority through an authority application 240 running on a server 104 or on a host communication endpoint 108, and may be distributed to conference call participant communication endpoints 116 via the communication network 116.

At step 408, the conference call participants indicate to a client alerter application 244 those agenda 232 items that are of interest to the participant, or in connection with which the participant wishes to participate (step 408). The client alerter application 244 may be running on a server 104, host communication endpoint 108, and/or participant communication endpoint 116. As can be appreciated by one skilled in the art after consideration of the present disclosure, the entry of agenda 232 items and the registration or indication by participants of agenda 232 items of interest can be performed in advance of the conference call.

The host initiates the conference at the scheduled date and time (step 412). The participants join the conference call, and engage the client alerter application 244 to listen to the conference. At step 420, a determination is made as to whether the conference call is ending. If it is determined that the call is not ending, the process proceeds with the client alerter application 244 listening for key phrases to infer which agenda item is being discussed (step 424). For example, the alerter application 244 may infer that a new agenda item is being discussed after detecting the conference call host saying "We are moving on to item number ##" before discussing that item. In accordance with other embodiments of the present invention, the alerter application 244 may detect key words or phrases that are associated with a particular agenda 232 item to identify the agenda 232 item being discussed.

In response to the detection or identification of a new agenda 232 item at step 424, a determination is made as to whether the conference call participant has registered an interest in the new agenda 232 item (step 428). If the participant has registered an interest in the agenda item, an alert is provided to the participant (step 432). As with other embodiments of the present invention, the alert may comprise an audible and/or visible signal generated by a participant communication endpoint 116 associated with the registered participant. For example, a conference call notification signal application 240 running on a conference call participant endpoint 116, may operate to generate an audible and/or visible signal or message. Moreover, a message may include an identification of the particular agenda item in which the participant has registered an interest. This may further be performed in association with a conference call authority application 228 or other application that may be used to display an agenda 232 and/or indicate a current agenda item to a conference call participant. Accordingly, the participant is provided with an alert or notification to pay attention or to re-focus on the conference call, because an agenda 232 item of interest to the participant is or is about to be discussed. Therefore, a conference call participant who may be engaged in multitasking or who has otherwise begun attending to something other than the conference call is alerted to pay attention to the conference call, so that they can avoid missing an item or topic of interest. In accordance with embodiments of the present invention, the alerter application 244 may comprise a voice recognition (VR) facility or system.

After an alert is generated at step 432, or after a determination is made at step 428 that the participant has not registered an interest in the current agenda item, the process may return to step 420, to determine whether the conference call is ending. If it is determined that the conference call is ending, the process may end.

Figure 5:
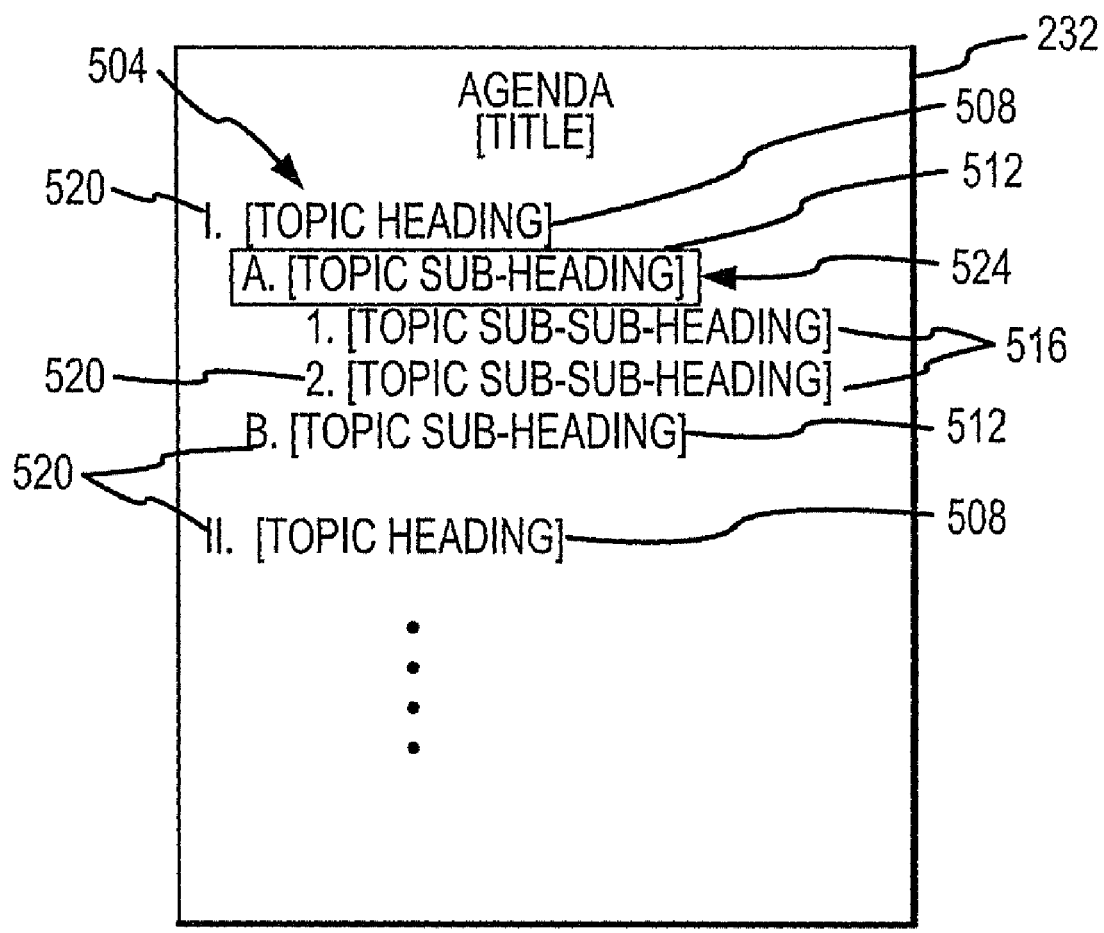
FIG. 5 is an example of a conference call agenda in accordance with embodiments of the present invention.

FIG. 5 depicts a conference call agenda 232 in accordance with embodiments of the present invention. In general, the agenda 232 includes a number of items 504, which may comprise topics or subjects to be discussed or otherwise covered during a conference call. The form of the agenda 232 may simply comprise a list of items 504. The agenda 232 may also include items 504 that are organized into headings 508, sub-headings 512, sub-sub-headings 516, etc. Moreover, any headings or sub-headings 508-516 may be associated with an identifier 520. Accordingly, the agenda 232 may comprise an outline.

The selection of an agenda item 504 for discussion (i.e. the indication of a current agenda item or a transition from an agenda item 504 previously discussed to a next agenda item 504) may be performed by the conference call host through the conference call host communication endpoint 108. More particularly, a selection of an agenda item 504 displayed by a user output device 216 may be made by the host using a cursor controlled by a user input device 212 comprising a pointing device, such as a mouse. An indication of the current agenda item 504 may be provided by highlighting or providing a pointer 524 to that agenda item 504. The display of the agenda 232 and the receipt of input comprising a selection of an agenda item may be performed through execution of instructions comprising the authority application 228 in connection with data comprising the agenda 232. A copy of the agenda 232 showing the current agenda item 504 may be displayed concurrently to conference call participants, through an output device 216 associated with conference call participant communication endpoints 116.

In accordance with embodiments of the present invention that use an alerter application 244 for detecting a particular agenda item 504 being covered, key words associated with particular agenda items 504 may be obtained by the alerter application 244 from the agenda 232. The alerter application 244 may then identify a current agenda item 504 from identifying associated words. Alternatively or in addition, an alerter application 244 may detect speech by the conference call host or other authority indicating the identifier associated with the current agenda item 504 or the next agenda item 504 that will be discussed during the conference call.

As can be appreciated by one of skill in the art after consideration of the present disclosure, embodiments of the present invention can assist individual conference call participants in identifying when topics or agenda 232 items for a conference call that are of particular interest to the participant are being discussed. Accordingly, the conference call participant's time can be used more efficiently, by facilitating the completion of or participation in other tasks by the conference call participant while the conference call is in progress. Embodiments of the present invention can also provide an alert to a participant to a conference call who is only half listening or who is not paying attention to indicate when it is necessary for the participant to refocus on the conference call, so that discussions concerning topics of interest to the participant, or topics to which the participant is or may be expected to contribute, are in progress.

Although embodiments of the present invention have been discussed in the context of voice telephony conference calls, it should be appreciated that embodiments of the present invention are not limited to voice telephony conference calls. For example, embodiments of the present invention may also be applied in connection with video telephony conference calls or meetings. In addition, embodiments of the present invention may be applied to live meetings or conferences that are conducted in association or with the support of host 108 and participant 116 communication endpoints that are at least capable of providing a notification signal or alert to a participant.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for providing a notification signal to a conference call participant, comprising:
   entering a conference call agenda, wherein the agenda includes a plurality of items;
   registering by a conference call participant with an alerter application for notification of one of more of the agenda items when the one or more agenda items are being covered;
   initiating a conference call;
   listening to the conference call by the alerter application for at least a first key phrase, wherein listening for the first key phrase includes utilizing a voice recognition facility of the alerter application;
   receiving an indication of a next agenda item being covered, wherein receiving an indication of a next agenda item being covered includes receiving from the alerter application a signal indicating that the conference call has moved to a next agenda item, and wherein the voice recognition facility of the alerter application identifies the first key phrase in order to identify the next agenda item;
   identifying the next agenda item;
   determining whether notification of the identified agenda item is to be provided to a conference call participant;
   in response to determining that a conference call participant is to receive a notification signal for the identified agenda item, generating a notification signal and providing it to the conference call participant registered to receive a notification signal for the identified agenda item.

2. The method of claim 1, wherein receiving an indication of a next agenda item further includes receiving input from a conference call authority indicating that the conference call is moving to a next agenda item.

3. The method of claim 2, wherein the conference call agenda is entered into a conference call authority application.

4. The method of claim 1, wherein a plurality of conference call participants are registered to receive a notification of an agenda item, wherein a first conference call participant is registered to receive a notification signal for a first set of agenda items, wherein a second conference call participant is registered to receive a notification signal for a second set of agenda items, and wherein the first and second sets of agenda items are different from one another.

5. The method of claim 4, wherein in response to identifying a first agenda item the first conference call participant is provided with a notification signal, and wherein the second conference call participant is not provided with a notification signal in response to identifying the first agenda item.

6. The method of claim 5, wherein the notification signal provided to the first conference call participant includes presenting an identifier associated with the first agenda item.

7. The method of claim 1, wherein a plurality of conference call participants are registered with a central registration application to receive notification of an agenda item.

8. The method of claim 1, wherein registering a first conference call participant is performed by the first conference call participant through a conference call participant device.

9. A system for providing notification signals to conference call participants, comprising:
   a conference call authority device;
   data storage, wherein an agenda including a number of items is stored;
   programming code operable:
      to identify a current agenda item, wherein the programming code to identify a current agenda item receives input from a conference call host through the conference call authority device, wherein the programming code to identify a current agenda item identifies a current agenda item by using voice recognition to detect a key phrase in speech by at least one of the conference call participants;
      to identify a conference call participant registered to receive notification of an identified current agenda item;
      to send an alert signal to a conference call participant in response to identifying a conference call participant registered to receive notification of an identified current agenda item.

10. The system of claim 9, further comprising:
   a conference call participant device, wherein the conference call participant device is operable to provide an alert signal to a conference call participant.

11. The system of claim 10, wherein the conference call participant device is operable to provide output comprising conference call content to a conference call participant.

12. The system of claim 11, wherein the conference call participant device is operable to receive input comprising conference call content from a conference call participant.

13. A system for notifying registered participants of a conference call of a selected conference call agenda item, comprising:
- means for recording a conference call agenda, wherein the agenda includes a plurality of items;
- means for registering an interest of a conference call participant in one or more of the items included in the conference call agenda;
- means for detecting when a transition from one agenda item to another is being made, wherein the means for detecting when a transition from one agenda item to another is being made includes a voice recognition function that monitors speech by at least one conference call participant during a conference call and that in response to detecting a key phrase in the speech provides an indication that the conference call has moved to a next agenda item;
- means for identifying the agenda item that is being transitioned to, wherein the means for identifying the agenda item that is being transitioned to includes the voice recognition function that monitors speech by at least one conference call participant;
- means for identifying a conference call participant registered to receive a notification signal related to the identified agenda item;
- means for providing a notification signal to the identified conference call participant.

14. The system of claim 13, wherein said means for detecting when a transition from one agenda item to another is being made additionally receives input from a conference call host.

15. The system of claim 13, wherein said means for providing a notification signal to the identified conference call participant comprises a conference call participant communication endpoint.

16. The system of claim 13, further comprising means for interconnecting said means for identifying the agenda item being transitioned to said means for providing a notification signal to the identified conference call participant.

17. The method of claim 1, wherein the alerter application identifies the first key phrase from speech by a conference call authority.

18. The system of claim 9, wherein the programming code to identify a current agenda item uses voice recognition to detect words associated with the current agenda item.

19. The system of claim 18, wherein the words detected by the voice recognition are part of speech provided by the conference call host, and wherein the words do not identify a current agenda item if they are spoken by a conference call participant other than the conference call host.

20. The system of claim 13, wherein said voice recognition function operates in response to speech provided by a conference call host.

* * * * *

UNITED STATES PATENT AND TRADEMARK OFFICE
CERTIFICATE OF CORRECTION

| | | |
|---|---|---|
| PATENT NO. | : 8,019,069 B1 | Page 1 of 1 |
| APPLICATION NO. | : 11/553368 | |
| DATED | : September 13, 2011 | |
| INVENTOR(S) | : Shaiju Cyriac et al. | |

It is certified that error appears in the above-identified patent and that said Letters Patent is hereby corrected as shown below:

On the title page item (54) and in the specification, col. 1, Title: delete "ALTERING" and insert --ALERTING-- therein.

In the Claims:

Claim 13, Column 11, line 31, insert --and-- after "tified agenda item;".

Signed and Sealed this
Fourteenth Day of January, 2014

Michelle K. Lee
*Deputy Director of the United States Patent and Trademark Office*